(12) United States Patent
Seagriff

(10) Patent No.: US 7,264,371 B1
(45) Date of Patent: Sep. 4, 2007

(54) ILLUMINABLE MOUNTABLE STORAGE RECEPTACLE

(76) Inventor: Brian J Seagriff, 48 Sandy Hollow Dr., Smithtown, NY (US) 11787-3018

( * ) Notice: Subject to any disclaimer, the term of this patent is extended or adjusted under 35 U.S.C. 154(b) by 208 days.

(21) Appl. No.: 11/191,504

(22) Filed: Jul. 28, 2005

(51) Int. Cl.
*A45C 15/06* (2006.01)

(52) U.S. Cl. ...................... 362/156; 190/106; 190/124; 312/223.5; 362/396; 362/397; 362/542

(58) Field of Classification Search ........ 362/154–156, 362/499, 506, 540, 546, 542–544, 549, 169, 362/191, 194, 397, 396, 457, 458; 190/106, 190/124, 125; 312/114, 237, 223.5
See application file for complete search history.

(56) References Cited

U.S. PATENT DOCUMENTS

| | | | | |
|---|---|---|---|---|
| 3,045,900 A | * | 7/1962 | Zekendorf | 150/105 |
| 3,808,416 A | * | 4/1974 | Pottratz | 362/156 |
| 3,938,132 A | * | 2/1976 | Cunningham | 340/321 |
| 4,698,732 A | * | 10/1987 | Hickey | 362/154 |
| 5,459,648 A | * | 10/1995 | Courtney | 362/154 |
| 5,685,421 A | * | 11/1997 | Gilmore | 206/216 |
| 6,253,489 B1 | * | 7/2001 | Sung et al. | 47/65.7 |
| 6,270,233 B1 | * | 8/2001 | Holland | 362/154 |
| 6,485,159 B2 | * | 11/2002 | Pitts | 362/84 |
| 6,585,390 B2 | * | 7/2003 | Stone et al. | 362/156 |

* cited by examiner

*Primary Examiner*—Renee Luebke
*Assistant Examiner*—Gunyoung T. Lee
(74) *Attorney, Agent, or Firm*—Michael I. Kroll

(57) ABSTRACT

An illuminable storage receptacle that is mounted to a motor vehicle wheel well by suction cups disposed on the cover to cast white light from the bottom and rear portions in order to illuminate the subjacent work area. Red hazard lenses are disposed in the sidewalls and an amber hazard lens is disposed in the front wall. An interior compartment is disposed therein divided by a replaceable plate to form an illumination chamber to produce the light and a storage chamber for keeping lug nuts and the like while changing the tire. A strap having hook and loop fastener elements is provided to allow the user to selectively maintain the storage compartment on a substantially horizontal plane regardless of the angle of engagement of the cover with the vehicle.

12 Claims, 9 Drawing Sheets

ILLUMINABLE MOUNTABLE STORAGE RECEPTACLE

BACKGROUND OF THE INVENTION

1. Field of the Invention

The present invention relates generally to receptacles and, more specifically, to an illuminable mountable storage receptacle incorporating means for releasably fastening the storage receptacle to a surface, means for energizing the illuminable member, means for selectively varying the light beam angle of projection and means for storing articles within said receptacle.

The storage receptacle of the present invention is comprised of a receptacle having a bottom with opposing walls depending therefrom with a lid pivotally attached by a flexible hinge and a latch serving as releasable closure for said receptacle.

Incorporated within the body of the receptacle are a plurality of apertures covered by translucent panes with an interiorly positioned illuminable member that when energized emits light beams through said translucent panes. Means for energizing said illuminable element is provided through a length of electrically conductive cord having means for connecting to a power source. Preferably, the base of the receptacle is substantially a transparent pane with amber panes on the opposing sides and a red pane in the front wall.

Additionally provided are suction cups extending from the lid so that when opened the receptacle can be attached to a support with the interior compartment accessible for placement of articles for storage. The angular displacement of the receptacle relative to the lid is selectively positionable through employment of an adjustable strap extending between the lid and receptacle body.

For illustrative purposes one use for the present invention is depicted within the drawing figures, depicting the portable illuminable storage receptacle releasably fastened over a motor vehicle wheel well with an electrical connection to the vehicle's electrical system, such as through the cigarette lighter or other means including direct connection to the battery wherethrough the illuminable member is energized providing a source of light over said wheel well with the aforementioned means of changing the area of illumination through varying the length of said strap. Amber light beams are projected coparallel with the vehicle to the left and right with red emitted from the front of the receptacle. The compartmented interior can serve as temporary storage of lug nuts while changing a tire.

2. Description of the Prior Art

There are other lighting device designed for vehicle illumination. Typical of these is U.S. Pat. No. 2,786,935 issued to Geary on Mar. 26, 1957.

Another patent was issued to Steinle on Mar. 30, 1976 as U.S. Pat. No. 3,947,677. Yet another U.S. Pat. No. 4,727,462 was issued to Komonko on Feb. 23, 1988 and still yet another was issued on Aug. 15, 1989 to Hayward as U.S. Pat. No. 4,858,082.

Another patent was issued to DiGaetano on Aug. 13, 1991 as U.S. Pat. No. 5,040,100. Yet another U.S. Pat. No. 5,457,614 was issued to Duty on Oct. 10, 1995. Another was issued to Cabanatan, et al. on Sep. 24, 1996 as U.S. Pat. No. 5,558,426 and still yet another was issued on Dec. 25, 2001 to Baines as U.S. Pat. No. 6,332,700.

Another patent was issued to Sharper on Nov. 16, 2004 as U.S. Pat. No. 6,817,743. Yet another Japan Patent No. JP1081103 was issued to Toshiyuki on Mar. 27, 1989.

Another was issued to Khan on May 10, 1995 as U.K. Patent No. GB2283563 and still yet another was issued on Jan. 15, 2003 to Tamaki as Japanese Patent No. JP2003011720.

U.S. Pat. No. 2,786,935

Inventor: Robert R. Geary

Issued: Mar. 26, 1957

An under fender light attached to a flash shield of fender of a vehicle comprising a mounting plate carrying a lamp socket, a lamp in said socket, a shell having an opening therein, a transparent member between said plate and said shell and sealing said opening, a cover hingedly secured to said shell for overlying said opening to prevent light rays from passing out of said under fender light, said shell and said transparent member being substantially semi-cylindrical in shape, said transparent member having a portion projecting into said opening and lying flush with the outer surface of said shell.

U.S. Pat. No. 3,947,677

Inventor: Leo D. Steinle

Issued: Mar. 30, 1976

This invention relates to an emergency illumination system which is attachable to a fender portion of a vehicle and operable to both light the area adjacent and about the wheel structure plus outwardly therefrom to aid in changing a flat tire and illumination during emergencies. The emergency illumination system in one embodiment includes a lighting means having a light assembly attached at each fender portion and operable through an electrical means to either (1) illuminate all the wheel well areas by turning on an emergency flasher system of the vehicle; (2) operate a special switch on a turn indicator member to energize all of the light assemblies; and (3) having a switch member operable to be connected with the respective turn indicator lights so as to illuminate the forward ones of the light assemblies for reading house numbers and aid visually when turning corners. The emergency illumination system can be used for clearance lights on trucks, campers, etc. and constructed of various colors. In another embodiment, the emergency illumination system includes a lighting means having a self contained battery member to provide an independent power supply to each light assembly.

U.S. Pat. No. 4,727,462

Inventor: James R. Komonko

Issued: Feb. 23, 1988

A clamp-on magnet for trouble lamps of a type which have a shield on one side of an electric bulb. A magnet is connected to a housing and the housing has a pair of spaced apart parallel flanges extending therefrom. Each of the flanges has a hole extending therethrough. A pair of wire clamps having helical central portions and a pair of arms extending from each end of the helical central portion are pivotally attached by fasteners to the holes in the parallel flanges. These spring clamps have hooks on the end thereof so that the arms of the spring clamp can be pulled apart to extend over the shield of the trouble lamp and are biased back into tight engagement with the shield to hold the magnet to the trouble lamp. When the magnet is in use by placing it against a metal surface, such as that of an automobile, the trouble lamp can be pivoted through approximately 250.degree and held in any position in between so that the light from the trouble lamp can be directed to where it is needed.

U.S. Pat. No. 4,858,082

Inventor: Walter Hayward

Issued: Aug. 15, 1989

A visor-mountable emergency light system includes a housing of a size and shape to be mountable to and carried by a vehicle sunvisor. One or two portions of the housing have a conformation receptive of a strobotron exposed for directing light outwardly away from the housing. Another portion of the housing is conformed to define a cavity within which is located a firing unit mounted and connected to cyclically ignite the strobotron. The strobotron includes a light-transmissive lens that has a central area which transmits light of one or more specific colors and a peripheral area which transmits at least primarily uncolored light.

U.S. Pat. No. 5,040,100

Inventor: Ronald Di Gaetano

Issued: Aug. 13, 1991

A vehicle wheel well illumination device, comprising a pair of light sources and a resilient rod interconnecting the light sources in a spaced apart configuration. The resilient rod is capable of elastic deformation under a manual bending effort to bring the rod in a condition suitable to enter a wheel well of a vehicle. Discontinuance of the bending effort causes the rod to partially recover its original form, frictionally engaging the wheel well and retaining in place the light sources providing adequate lighting conditions.

U.S. Pat. No. 5,457,614

Inventor: Earl A. Duty

Issued: Oct. 10, 1995

A work light including a pair of magnetic base members for supporting the light on a magnetic surface. An arcuate arm extends from each of the base members and a fluorescent light is supported at an end of the arms distal from the base members. The arms may be pivoted relative to the base members in order to position the light at a desired location relative to a work area.

U.S. Pat. No. 5,558,426

Inventor: Dennis C. Cabanatan

Issued: Sep. 24, 1996

A set of automotive wheel lights (70) for illuminating the wheels (75f/75r) of an automobile (85) in operation at night comprises a plurality of lights, one for each wheel (75f/75r), each mounted on the frame (86) of the automobile (85) near a respective wheel (75f/75r). Each light includes a light bulb (45) in a socket (30), held fixed at its lighting position at the lighting end (27) of a rigid arm (20) bent towards the wheel (75f/75r) of the automobile (85) and mounted onto and extending from the automobile (85); the light bulb (45) is encased in a protective light bulb cover and lens in one (35) which directs illumination onto the entire outside surface of the wheel (75f/75r). The light bulb (45) in the socket (30) is electrically connected to the power source (95) of the automobile (85) sharing a single switching control (96) with the parking lights and headlights (80) of the automobile (85).

U.S. Pat. No. 6,332,700

Inventor: Albert L. Baines

Issued: Dec. 25, 2001

A lighting assembly is detachably mounted in an opening in the wheel well panel of a vehicle. The lighting assembly has a base member with flexible sidewalls and end walls. The base member defines an opening near the first end wall forming a finger pull. A lamp holder is mounted on the base member near the second end wall. A clear lens covers a lamp in the lamp. An extensible power cable is attached to the lamp holder. The lighting assembly detaches from the wheel well to illuminate the wheel when changing a tire.

U.S. Pat. No. 6,817,743

Inventor: Allen Sharper

Issued: Nov. 16, 2004

A vehicle wheel illumination system is a device having four separate light assemblies that are affixed above a tire and within the wheel well above the respective tire. Each light assembly includes a housing formed from a base, a wall and a cap that is removable. The base houses the electrical wiring that is coupled with a bulb stem. A bulb is inserted into the bulb stem to provide illumination. The cap includes a translucent lens through which the illuminated bulb is transmitted. The housing further includes mounting means for attaching the housing to the wheel well. The electrical wiring is further coupled to the electrical system of the automobile.

Japanese Patent Number JP1081103

Inventor: Kondo Toshiyuki, et al.

Issued: Mar. 27, 1989

PURPOSE: To miniaturize a lamp fitting for a vehicle and to simplify its mounting, by structuring it by a transparent and cylindrical housing and a freely rotatable board in the housing.

CONSTITUTION: A board fixing part 3c is fitted by a screw 4 to a ring 3b with a suction cup 3a attached in a freely rotatable state, and a printed board 5 with a LED 5a mounted is locked into the fixing part 3. In this case, the housing 2 is locked into the ring 3b. The board 5 and the fixing part 3c are freely rotated in a housing 2 against the ring 3b by rotating the screw 4. Wherever they are rotated, light emission of the LED 5a is not hindered because the housing 2 is transparent. By this structure, a lamp fitting which is compact, easy to mount and does not impede a driving view can be obtained.

U.K. Patent Number GB2283563

Inventor: Tariq Amin Khan

Issued: May 10, 1995

A torch or a flash-light is characterized in that a suction cup is mounted on its base, the suction cup provides a gripping force to secure the weight of the torch or flash-light to the required surface.

Japanese Patent Number JP2003011720

Inventor: Ohashi Tamaki

Issued: Jan. 15, 2003

PROBLEM TO BE SOLVED: To provide a display device for expressing thanks to a third party conceding running of its own vehicle. SOLUTION: This display device consists of a display device 15 provided with lamps 1r, 1y, 1g emitting different color light on an upper face of a case body 20 and a suction cup mechanism 21 mountable on a window of own vehicle in both end parts thereof, an operation control box 17 provided with an operation control means for lighting the lamps for a fixed period of time, and a switch panel 2 for operating the operation control means, and they are mutually connected by a cable 19.

While these lighting devices may be suitable for the purposes for which they were designed, they would not be as suitable for the purposes of the present invention, as hereinafter described.

SUMMARY OF THE PRESENT INVENTION

A primary object of the present invention is to provide an illuminable storage receptacle mountable to a support.

Another object of the present invention is to provide an illuminable storage receptacle comprising a compartment and pivotal lid having a latch for closure with a plurality of apertures having translucent panes fastened thereover Yet another object of the present invention is to provide an illuminable storage receptacle having suction cups fastened to the top of the lid.

Still yet another object of the present invention is to provide an illuminable storage receptacle having an electrically conductive cord with connective means for attachment to a power source.

Another object of the present invention is to provide an illuminable storage container wherein a transparent pane is fastened to the base of the receptacle with amber tinted panes fastened to the opposing sides and red tinted pane fastened to the front side of the receptacle.

Yet another object of the present invention is to provide an illuminable storage receptacle wherein the area illuminated can be changed by varying the length of a strap extending between the lid and body of the compartment.

Still yet another object of the present invention is to provide an illuminable storage receptacle having a portion of the compartment for placement of articles therein.

Additional objects of the present invention will appear as the description proceeds.

The present invention overcomes the shortcomings of the prior art by providing an illuminable mountable storage receptacle incorporating means for releasably fastening the storage receptacle to a surface, means for energizing the illuminable member, means for selectively varying the light beam angle of projection and means for storing articles within said receptacle.

The storage receptacle of the present invention is comprised of a receptacle having a bottom with opposing walls depending therefrom with a lid pivotally attached by a flexible hinge and a latch serving as releasable closure for said receptacle.

Incorporated within the body of the receptacle are a plurality of apertures covered by translucent panes with an interiorly positioned illuminable member that when energized emits light beams through said translucent panes. Means for energizing said illuminable element is provided through a length of electrically conductive cord having means for connecting to a power source. Preferably, the base of the receptacle is substantially a transparent pane with amber panes on the opposing sides and a red pane in the front wall.

Additionally provided are suction cups extending from the lid so that when opened the receptacle can be attached to a support with the interior compartment accessible for placement of articles for storage. The angular displacement of the receptacle relative to the lid is selectively positionable through employment of an adjustable strap extending between the lid and receptacle body.

For illustrative purposes one use for the present invention is depicted within the drawing figures, depicting the portable illuminable storage receptacle releasably fastened over a motor vehicle wheel well with an electrical connection to the vehicle's electrical system, such as through the cigarette lighter or other means including direct connection to the battery wherethrough the illuminable member is energized providing a source of light over said wheel well with the aforementioned means of changing the area of illumination through varying the length of said strap. Amber light beams are projected coparallel with the vehicle to the left and right with red emitted from the front of the receptacle. The compartmented interior can serve as temporary storage of lug nuts while changing a tire.

The foregoing and other objects and advantages will appear from the description to follow. In the description reference is made to the accompanying drawings, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

In order that the invention may be more fully understood, it will now be described, by way of example, with reference to the accompanying drawing in which.

DESCRIPTION OF THE REFERENCED NUMERALS

Figure 1:
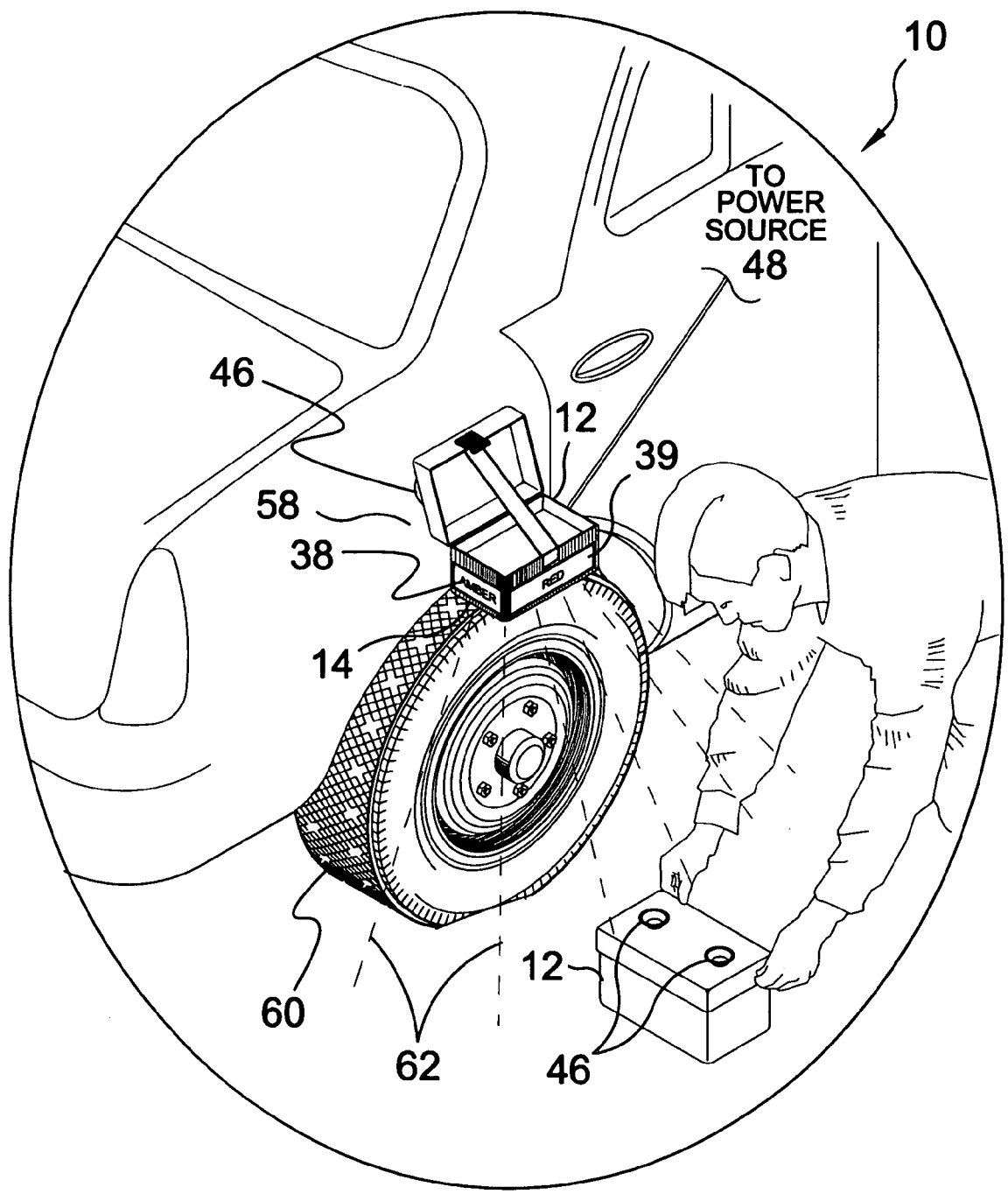
FIG. 1 is an illustrative view of the present invention in use.

Turning now descriptively to the drawings, in which similar reference characters denote similar elements throughout the several views, the figures illustrate the Illuminable Mountable Storage Receptacle of the present invention of the present invention. With regard to the reference numerals used, the following numbering is used throughout the various drawing figures.

10 Illuminable Mountable Storage Receptacle of the present invention
12 storage receptacle
14 bottom of 12
16 front wall of 12
18 rear wall of 12
20 sidewall of 12
22 interior compartment of 12
24 illumination chamber
26 storage compartment
28 light-producing means
30 light fixture
32 light element
34 fluorescent light
36 removable plate
38 amber lens strip
39 red lens strip
40 clear lens strip
42 clear lens material of 14
44 cover member
46 suction cup
48 power source
50 DC adapter and cord
52 retainer strap
54 hook and loop fastener element
56 snap lock of 44
58 vehicle body
60 tire
62 white light
64 user
66 hinge element
68 living hinge

DETAILED DESCRIPTION OF THE PREFERRED EMBODIMENT

The following discussion describes in detail one embodiment of the invention (and several variations of that embodiment). This discussion should not be construed, however, as limiting the invention to those particular embodiments, practitioners skilled in the art will recognize numerous other embodiments as well. For definition of the complete scope of the invention, the reader is directed to appended claims.

FIG. 1 is an illustrative view of the present invention 10 in use. The illuminable mountable storage receptacle present invention 10 is a storage receptacle 12 to illuminate the work area when changing tires 60 during night or day time and attaches above a vehicle's wheel well body 58 by means of two suction cups 46. The device is powered by the vehicle's 12v power supply 48 and provides a 15 foot cord and adapter 50 to be inserted into the vehicle's lighter receptacle. The device provides white lens bottom 14 and a clear lens strip in the rear that shine white light 62 in a downward direction and toward the vehicle illuminating a work area, an amber lens 38 emanating from the forward side of the box for safety and red lenses 39 projecting from the sides towards traffic for safety. The device provides storage room for lug nuts so the lug nuts are not lost on the ground. Within the lower portion of the device is a light fixture to provide illumination to all lenses.

Figure 2:
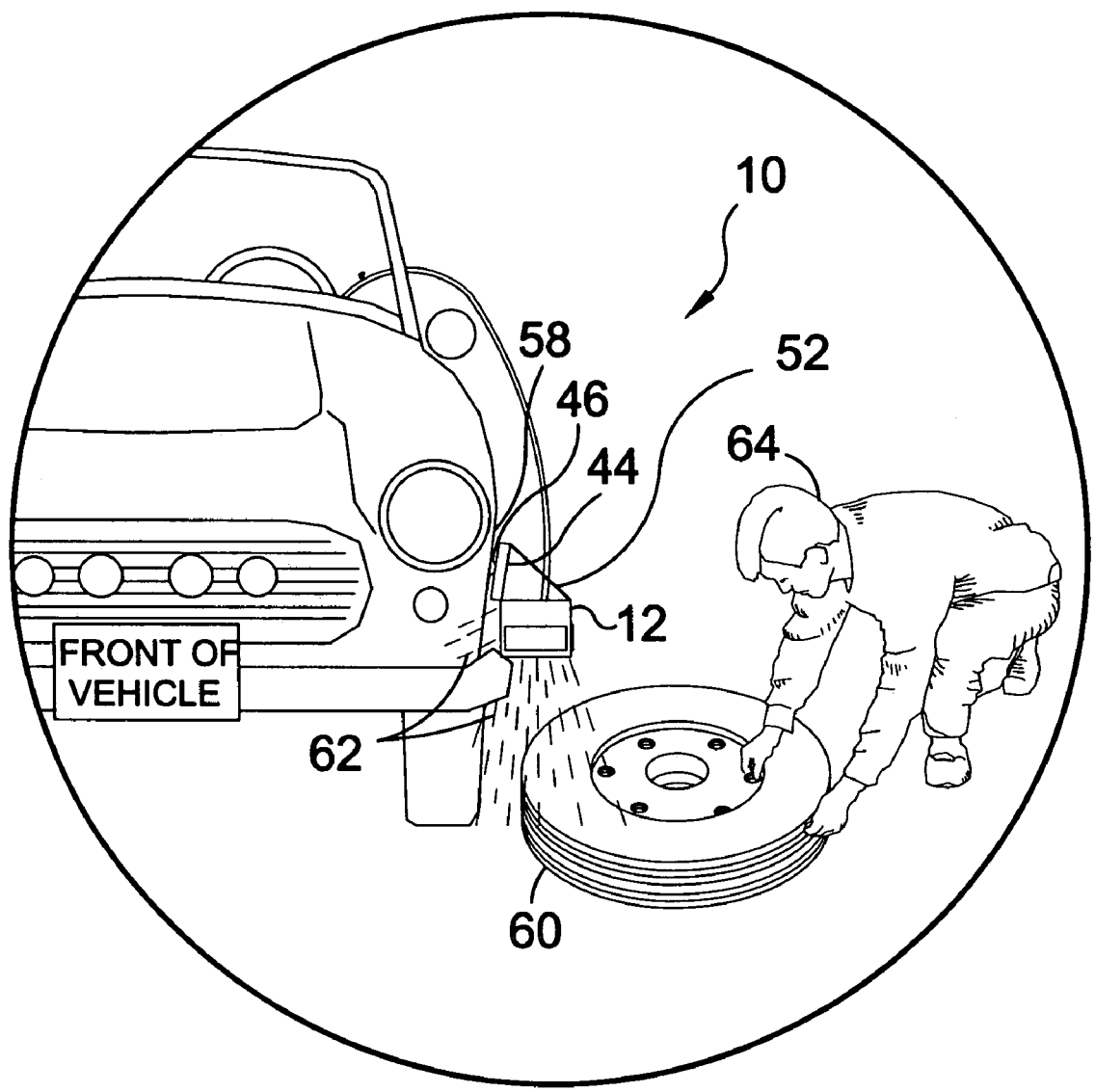
FIG. 2 is an illustrative view of the present invention in use on the front of a vehicle.

FIG. 2 is an illustrative view of the present invention 10 in use on the front of a vehicle body 58. Shown is the present invention 10 secured to the body 58 with suction cups 46 and casting white light 62 below and behind the storage receptacle 12 to illuminate the work area where the tire 60 is being changed. The cover member 44 conforms to the angle of the vehicle body 58 which varies from vehicle to vehicle as does the angle between the front and rear wheel wells of the same vehicle. The storage compartment 12 may be adjusted accordingly by the user 64 to compensate for the angle in order to maintain a substantially parallel plane with the surface of the ground. This is accomplished through the use of a retainer strap 52 that communicates between the cover member 44 and the storage compartment 12 and has mating hook and loop fastener elements to allow the user to selectively adjust the length thereof.

Figure 3:
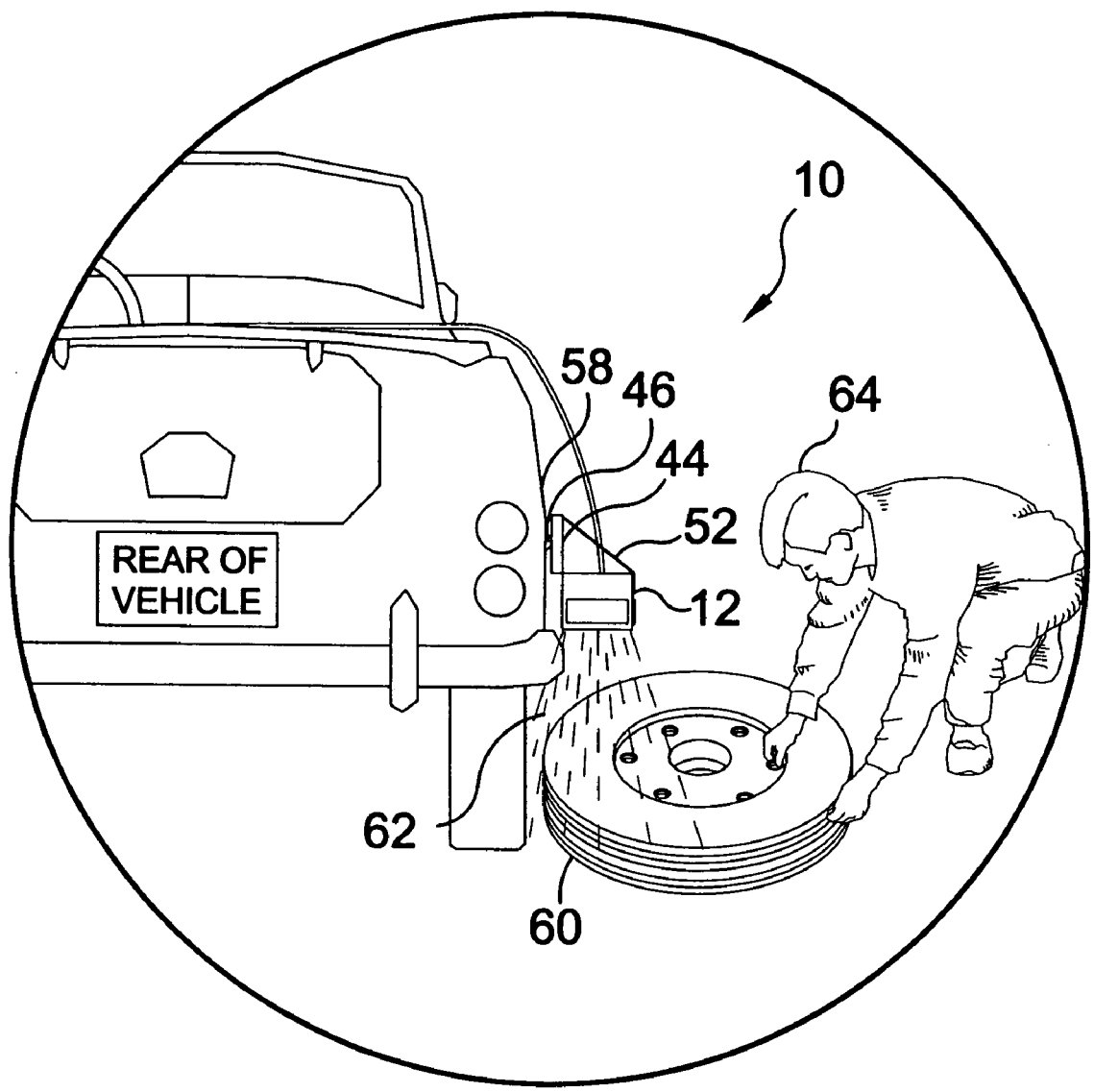
FIG. 3 is an illustrative view of the present invention in use on the rear of a vehicle.

FIG. 3 is an illustrative view of the present invention 10 in use on the rear of a vehicle body 58. Shown is the present invention 10 secured to the body 58 with suction cups 46 and casting white light 62 below and behind the storage receptacle 12 to illuminate the work area where the tire 60 is being changed. The cover member 44 conforms to the angle of the vehicle body 58 which varies from vehicle to vehicle as does the angle between the front and rear wheel wells of the same vehicle. The storage compartment 12 may be adjusted accordingly by the user 64 to compensate for the angle in order to maintain a substantially parallel plane with the surface of the ground. This is accomplished through the use of a retainer strap 52 that communicates between the cover member 44 and the storage compartment 12 and has mating hook and loop fastener elements to allow the user to selectively adjust the length thereof.

Figure 4:
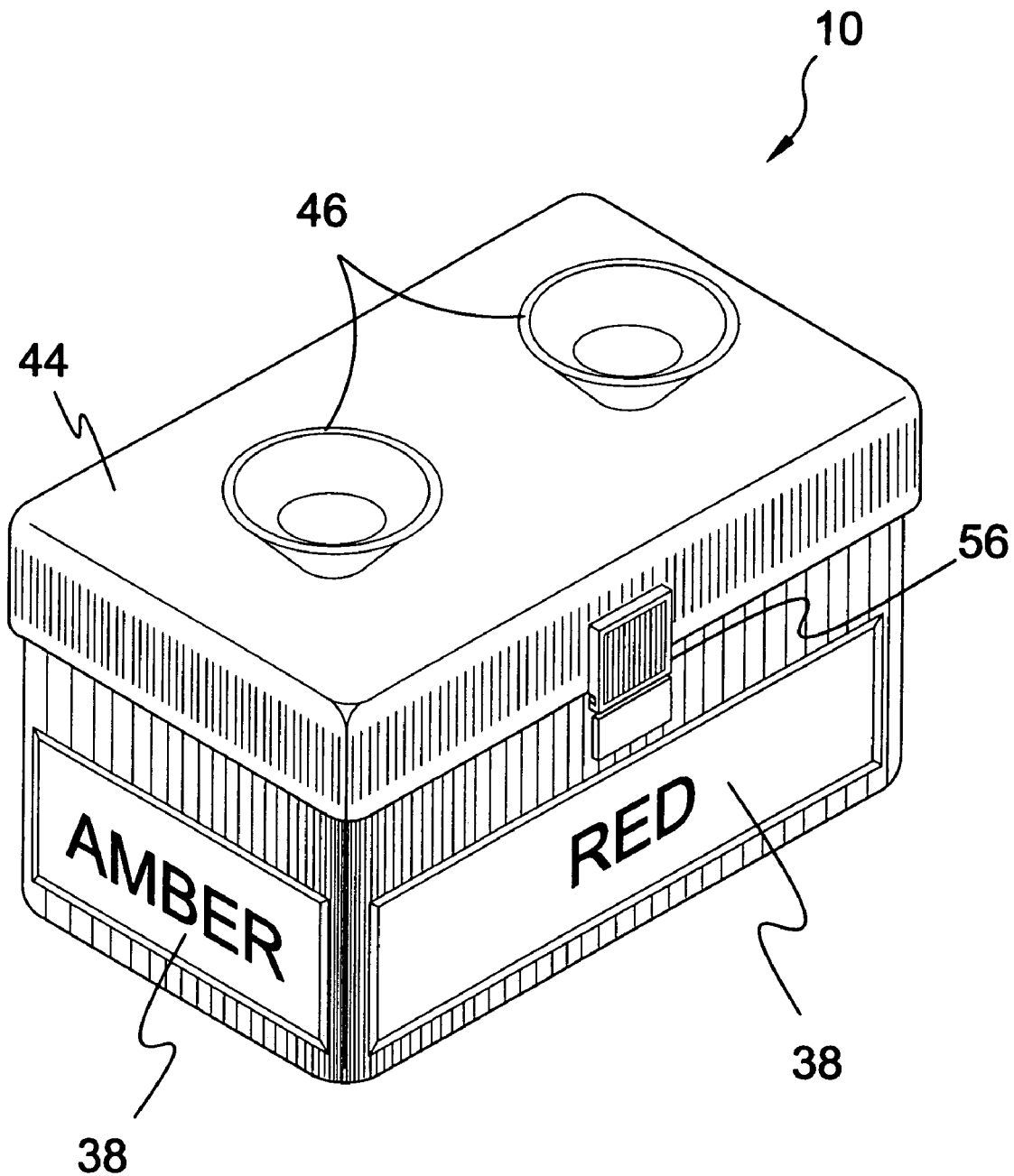
FIG. 4 is a perspective view of the present invention.

FIG. 4 is a perspective view of the present invention 10. The suction cups 46 on the cover member 44 serve to attach to the vehicle body above the wheel well in a manner that won't damage the finish of the vehicle and could be used on all vehicles since metal is not currently used for the vehicle bodies in most cases. A snap-lock 56 is provided to maintain the cover member 44 in the closed position for storage and transport. Also shown is the amber lens strip 38 incorporated in the front wall 16 and an amber lens strip 38 which are incorporated into both sidewalls 20.

Figure 5:
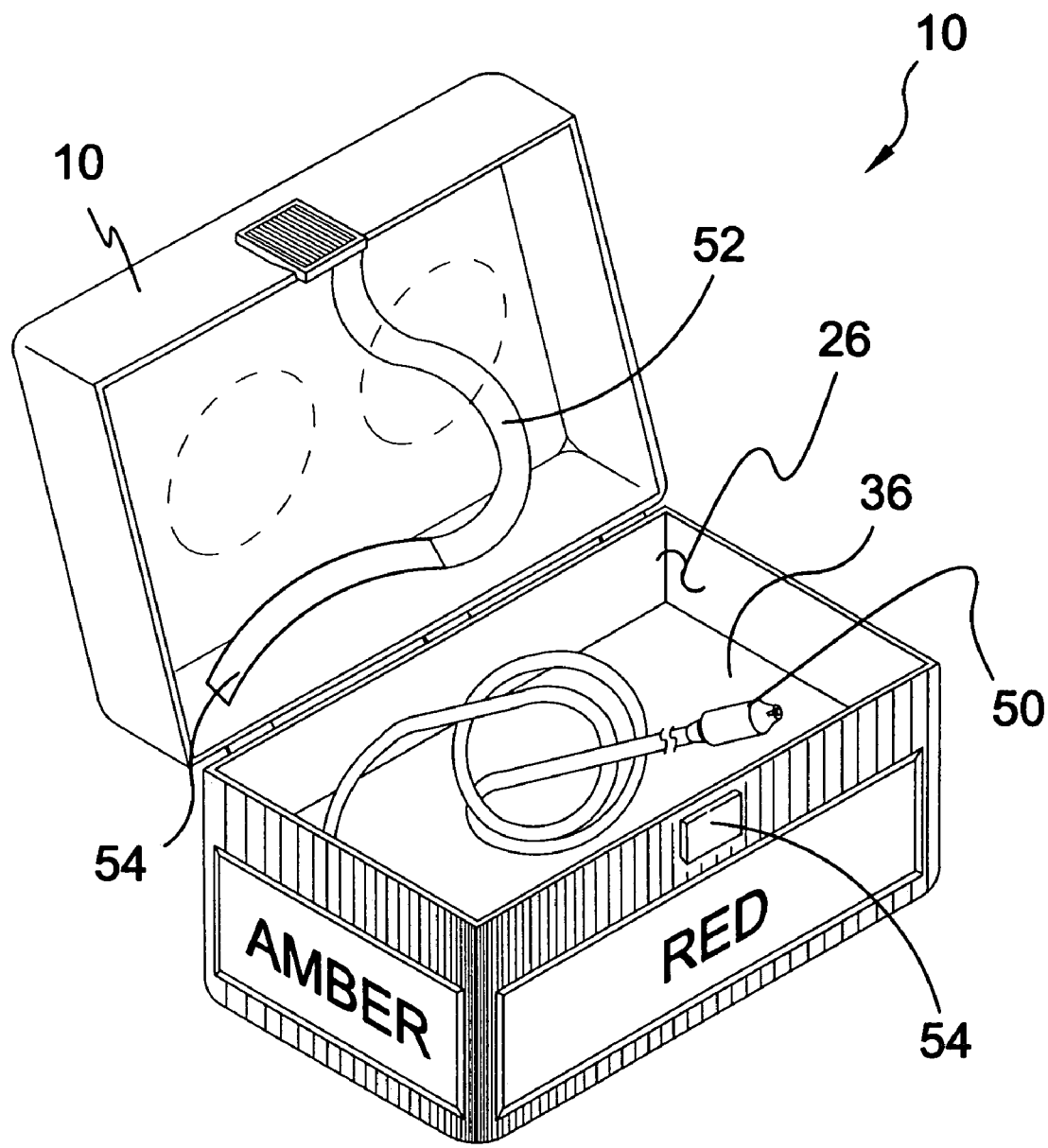
FIG. 5 is a perspective view of the present invention having lid in open position.

FIG. 5 is a perspective view of the present invention 10 having the lid 44 in an open position. Shown is the storage compartment 26 of the storage receptacle 12 including a 12 VDC adapter and cord 50 and the retaining strap 52. One end of the retaining strap 52 is affixed to the cover member 44 and the other end engages the storage receptacle 12 when in use through mating hook and loop fastener elements 54. A removable plate 36 forms the base of the storage compartment 26.

Figure 6:
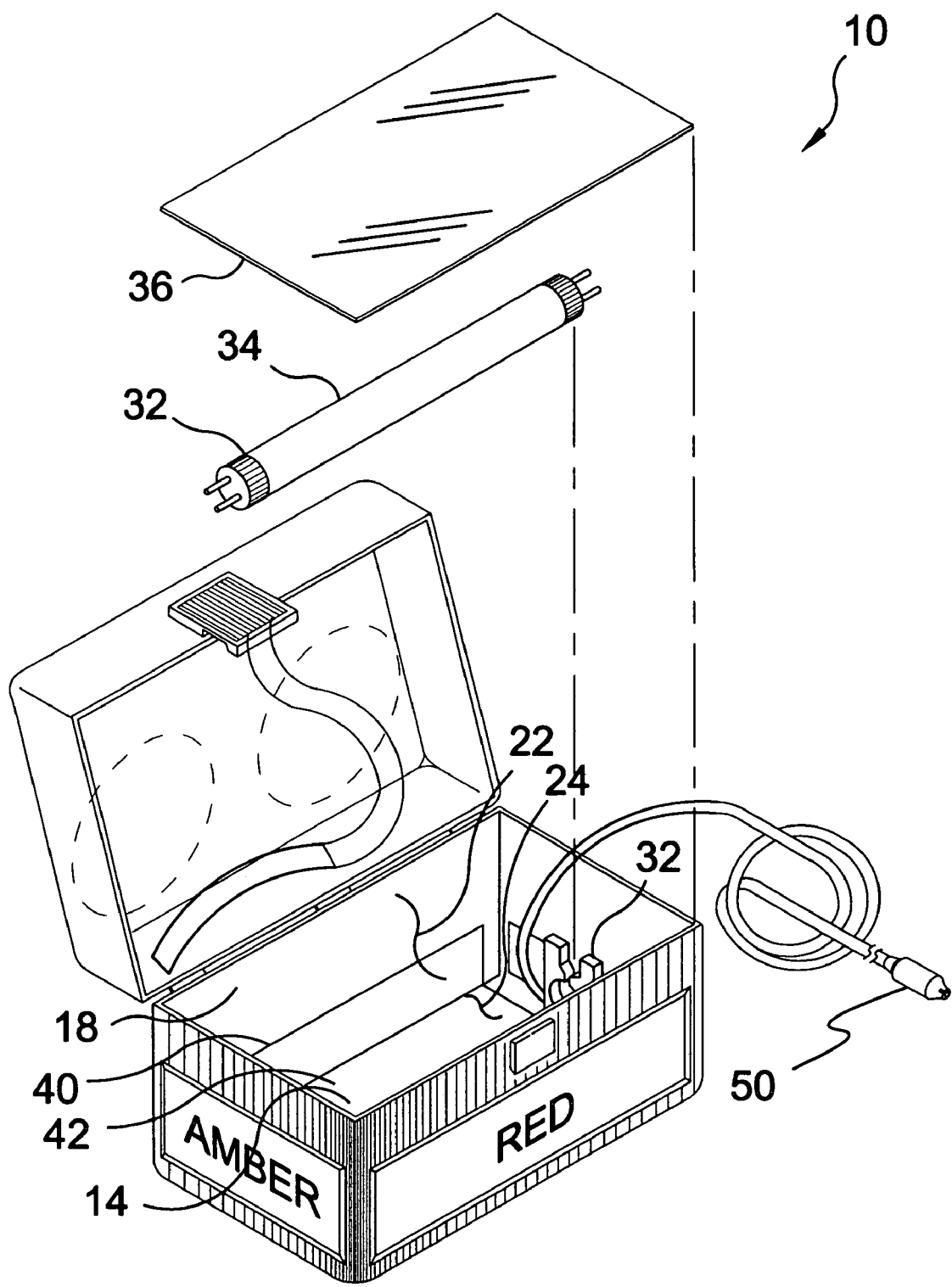
FIG. 6 is an exploded view of the present invention.

FIG. 6 is an exploded view of the present invention 10. Shown is the interior compartment 22 that houses the illumination chamber 24 and the storage compartment which are divided by a removable plate 36. A light fixture 32 and a lighting element 32, in this case a fluorescent lamp 34, are housed therein. The power adapter and cord 50 provide power from an external power source, preferably a cigarette lighter of the associated vehicle. Also shown is the clear lens material 42 of the bottom side 14 and the clear lens strip 40 of the rear wall 18.

Figure 7:
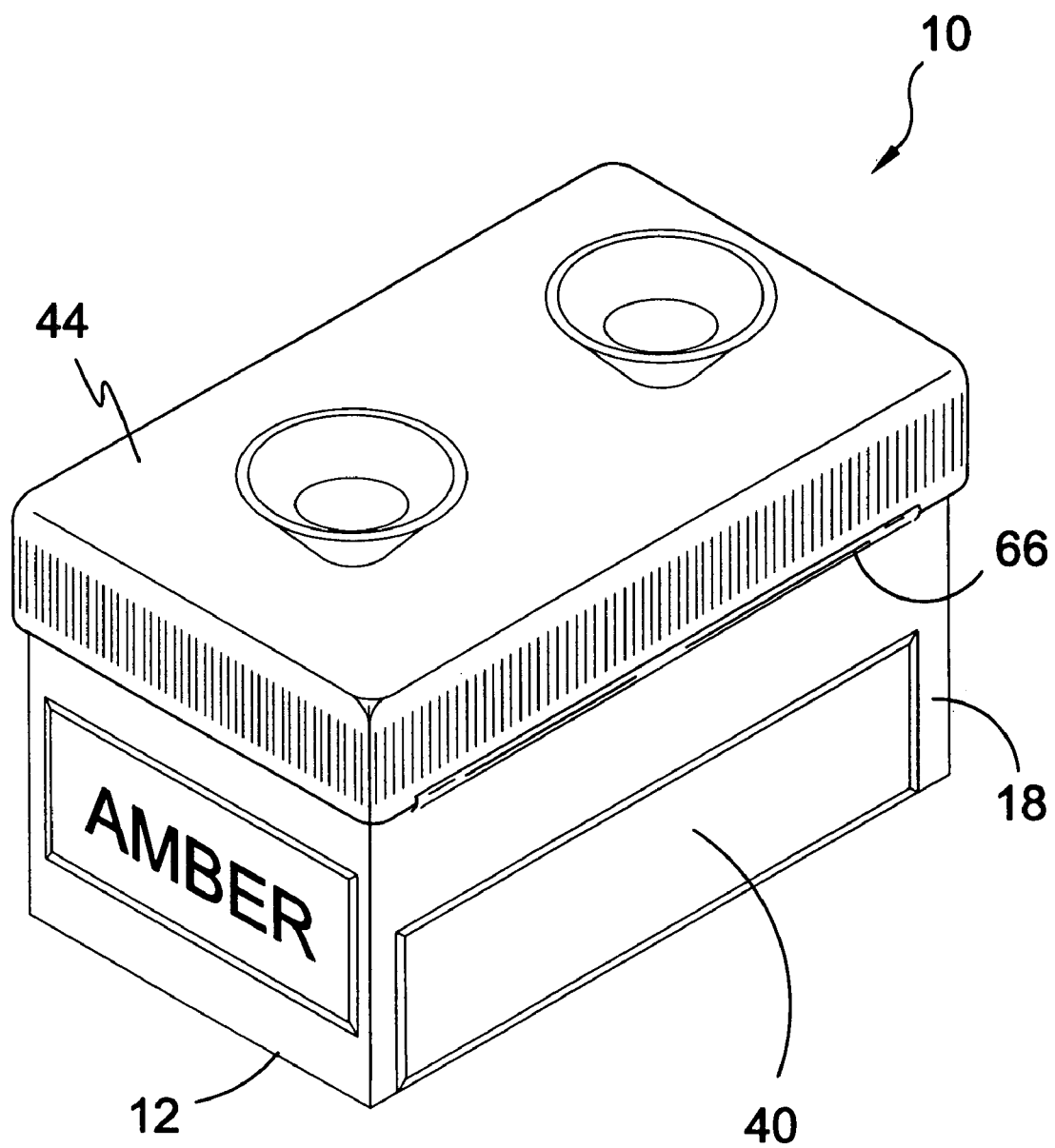
FIG. 7 is a perspective rear view of the present invention.

FIG. 7 is a perspective rear view of the present invention 10. Shown is a perspective rear view of the present invention 10 revealing the clear lens 40 in the rear wall 18 and the hinge element 66 connecting the storage receptacle 12 and the cover member 44.

Figure 8:
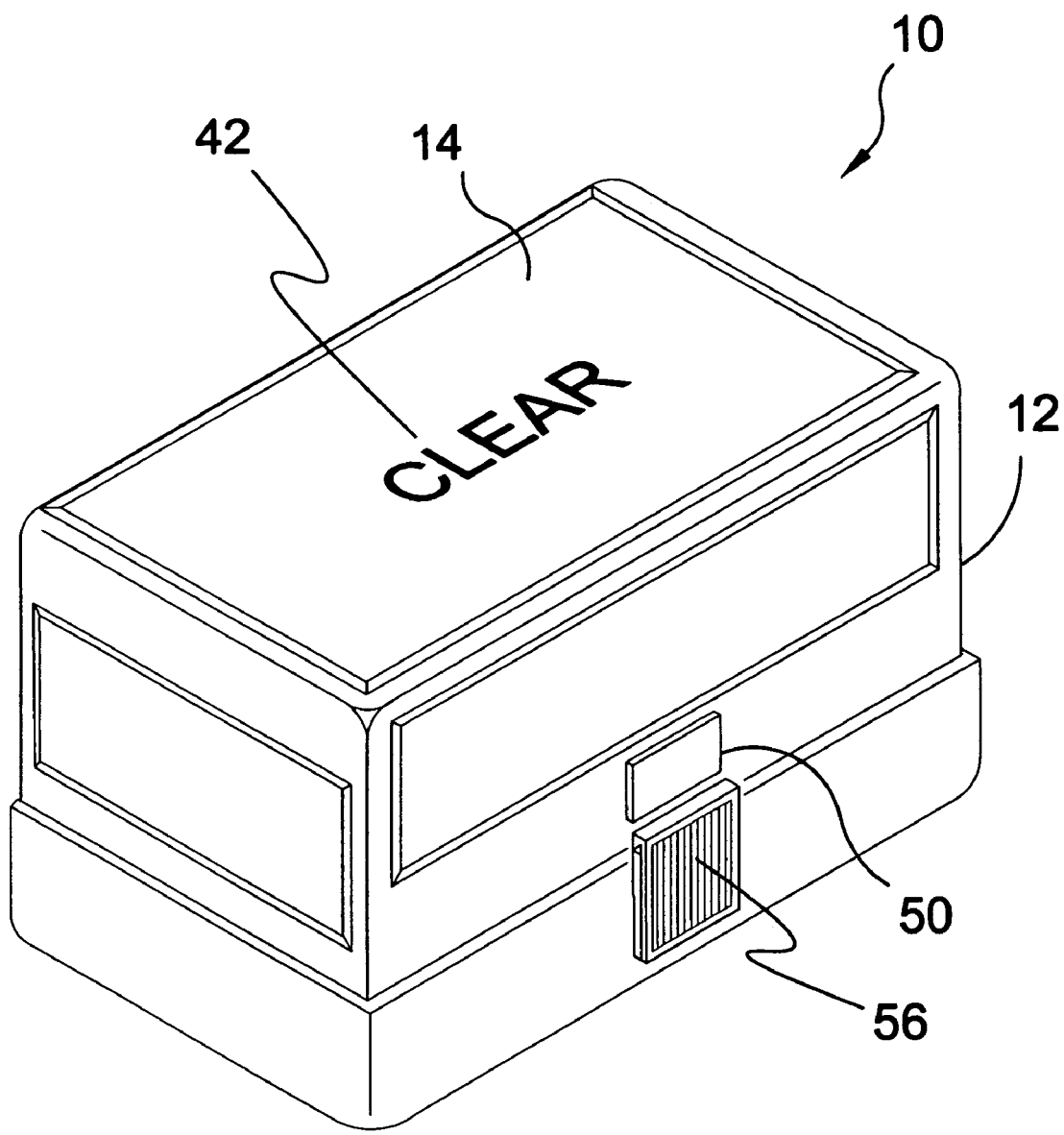
FIG. 8 is a perspective bottom view of the present invention.

FIG. 8 is a perspective bottom view of the present invention 10. Shown is a perspective bottom view of the present invention 10 revealing the clear lens material 42 forming the bottom side 14 of the storage receptacle 12. Also shown is the snap-lock 56 and a hook and loop fastener element 50 to which the retainer strap is connected when in use.

Figure 9:
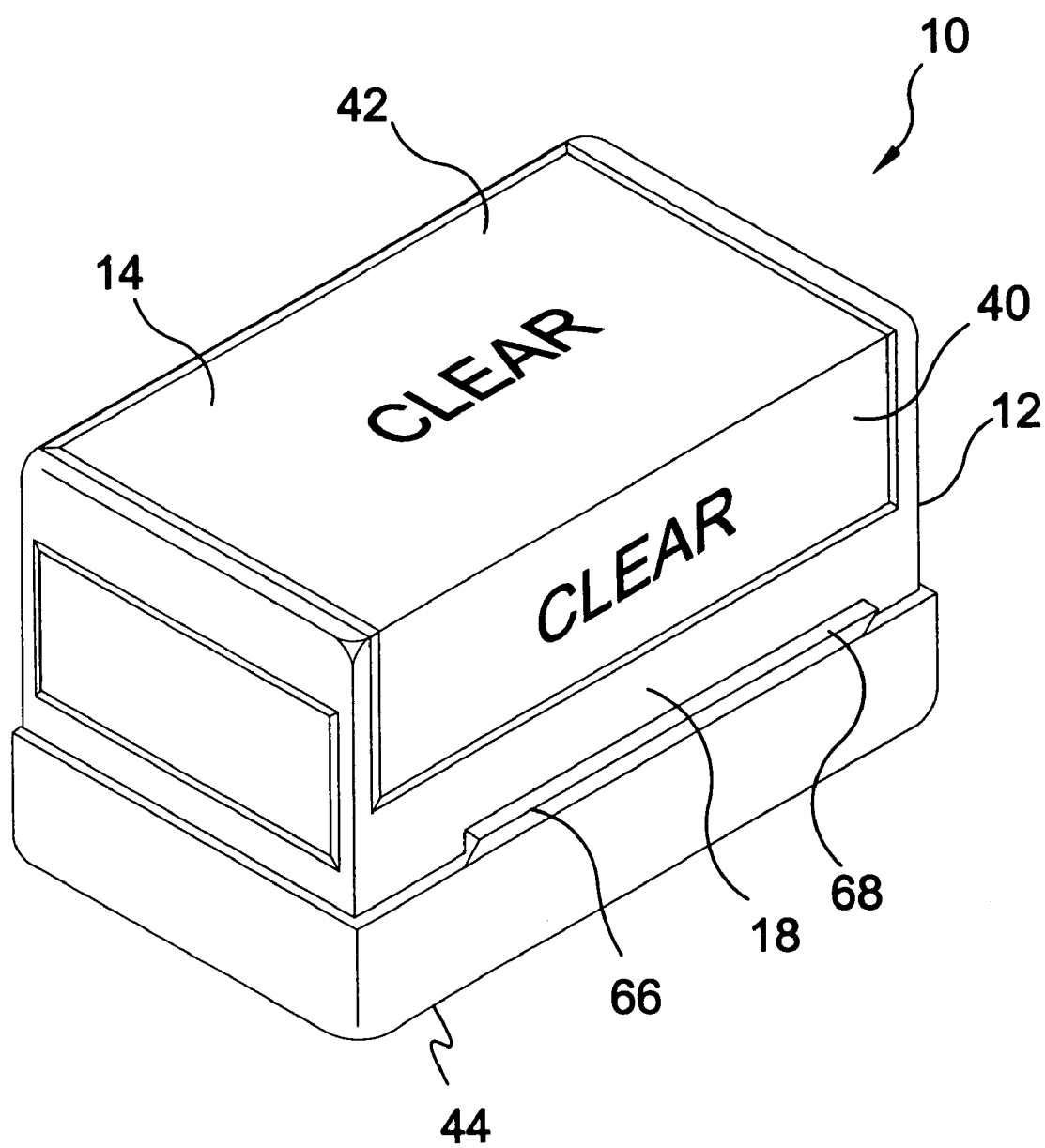
FIG. 9 is a bottom perspective rear view of the present invention 10.

FIG. 9 is a bottom perspective rear view of the present invention 10. Shown is a perspective rear view of the present invention 10 revealing the clear lens 40 in the rear wall 18, the clear lens material 42 forming the bottom side 14 of the storage receptacle 12 and the hinge element 66 connecting the storage receptacle 12 and the cover member 44. The hinge element 66 is depicted as a living hinge 68 integral with the cover member 44 and the storage receptacle 12.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. An illuminable, mountable storage receptacle comprising:
    a) a bottom side comprised of a clear lens material that allows for the travel of light therethrough;
    b) a front wall depending from said bottom side;
    c) a rear wall depending from said bottom side opposite said front wall;
    d) a pair of opposing sidewalls depending from said bottom side and in communication with said front wall and said rear wall;
    e) an interior compartment defined by said front wall, said rear wall and said sidewalls;
    f) a light-producing means disposed within said interior compartment;
    g) a translucent amber lens strip incorporated within each said sidewall proximal said light-producing means;
    h) a translucent red lens strip incorporated within said front wall proximal said light-producing means;
    i) a clear lens strip incorporated within said rear wall proximal said light-producing means;
    j) a cover member hingedly attached to said rear wall;
    k) a means for releasably engaging the top of said cover to a substantially vertical object; and
    l) means for selectively adjusting the angle of said storage receptacle relative to the angle of said cover when said cover is engaged with said object.

2. An illuminable, mountable storage receptacle as recited in claim 1, wherein said interior compartment further includes a horizontal removable plate that divides said interior compartment into a lower illumination chamber with a storage compartment thereabove.

3. An illuminable, mountable storage receptacle as recited in claim 2, wherein said lighting means includes at least one lighting element, a light fixture for said lighting element and a power source for said light fixture.

4. An illuminable, mountable storage receptacle as recited in claim 3, wherein said lighting element is a fluorescent light.

5. An illuminable, mountable storage receptacle as recited in claim 3, wherein said lighting element is a halogen lamp.

6. An illuminable, mountable storage receptacle as recited in claim 3, wherein said lighting element is an incandescent lamp.

7. An illuminable, mountable storage receptacle as recited in claim 3, wherein said power source is a 12-volt DC adapter that plugs into a cigarette lighter of a vehicle.

8. An illuminable, mountable storage receptacle as recited in claim 1, wherein said means for engaging said cover to an object is a plurality of suction cups disposed on the top portion thereof.

9. An illuminable, mountable storage receptacle as recited in claim 8, wherein said means for selectively adjusting the angle of said storage receptacle comprises a retaining strap having a first end secured to the interior portion of said cover member and a second end that is releasably and selectively secured to said front wall by a strap-engaging means.

10. An illuminable, mountable storage receptacle as recited in claim 9, wherein said strap-engaging means is a pair of mating hook and loop elements disposed on said second end of said retaining strap and said front wall.

11. An illuminable, mountable storage receptacle as recited in claim 10, wherein said cover member is secured in a closed position when not in use with a snap-lock that secures to said front wall.

12. An illuminable, mountable storage receptacle as recited in claim 11, wherein said storage receptacle is installed for use by securing said suction cups of the open cover member to the surface immediately above the desired work area, engaging said mating hook and loop fastener elements accordingly to maintain a substantially horizontal position of said bottom of said storage compartment and applying power from said power source thereby illuminating said lighting element and effectively casting a white light over the intended work area and to the rear of said storage receptacle while simultaneously emanating red hazard lights from said sidewalls and an amber warning light from said front wall.

* * * * *